United States Patent
Yazykov

(10) Patent No.: US 10,240,324 B2
(45) Date of Patent: Mar. 26, 2019

(54) WATER-SUPPLY DEVICE

(71) Applicant: Andrey Yurievich Yazykov, Moscow (RU)

(72) Inventor: Andrey Yurievich Yazykov, Moscow (RU)

(*) Notice: Subject to any disclaimer, the term of this patent is extended or adjusted under 35 U.S.C. 154(b) by 0 days.

(21) Appl. No.: 15/523,622

(22) PCT Filed: Oct. 30, 2015

(86) PCT No.: PCT/RU2015/000725
§ 371 (c)(1),
(2) Date: May 1, 2017

(87) PCT Pub. No.: WO2016/068757
PCT Pub. Date: May 6, 2016

(65) Prior Publication Data
US 2017/0314237 A1    Nov. 2, 2017

(30) Foreign Application Priority Data

Oct. 31, 2014 (RU) ................................ 2014144131

(51) Int. Cl.
*B01D 35/02* (2006.01)
*B01D 35/14* (2006.01)
(Continued)

(52) U.S. Cl.
CPC ............ *E03B 7/04* (2013.01); *B01D 35/0276* (2013.01); *B01D 35/14* (2013.01); *C02F 1/004* (2013.01);
(Continued)

(58) Field of Classification Search
CPC . E03B 7/04; E03B 7/095; E03B 7/075; E03B 7/074; E03B 7/077; C02F 1/004;
(Continued)

(56) References Cited

U.S. PATENT DOCUMENTS

| 1,926,681 | A | * | 9/1933 | Lauterbur | ................. | C02F 1/42 |
| | | | | | | 210/190 |
| 3,463,981 | A | * | 8/1969 | Wires | ...................... | G01F 23/60 |
| | | | | | | 318/626 |

(Continued)

FOREIGN PATENT DOCUMENTS

| RU | 43889 U1 | 2/2005 |
| RU | 74574 U1 | 7/2008 |

(Continued)

*Primary Examiner* — Joseph W Drodge
(74) *Attorney, Agent, or Firm* — Nadya Reingand; Yan Hankin

(57) ABSTRACT

The invention is configured for water-supply and comprises the vertically oriented hydraulic accumulator; inlet and outlet connections; connected to a hydraulic accumulator filter with a removable cartridge, located in the casing; the hydraulic accumulator made in a suspended manner and equipped with the commutator with a flange for attachment to the hydraulic accumulator, located in its lower part. The commutator is made with channels, connected with the inlet and outlet connections, and with holes for attached controlling and regulating equipment. Filter casing is installed on the thread at the commutator. The invention reduces the size, and simplifies the structure of the device due to minimizing the number of transitions and connections, while simultaneous improving the conditions for monitoring and controlling water supply modes from one work place—from the commutator, which is the set of equipment for the device control automation in general.

8 Claims, 2 Drawing Sheets

Figure 3:
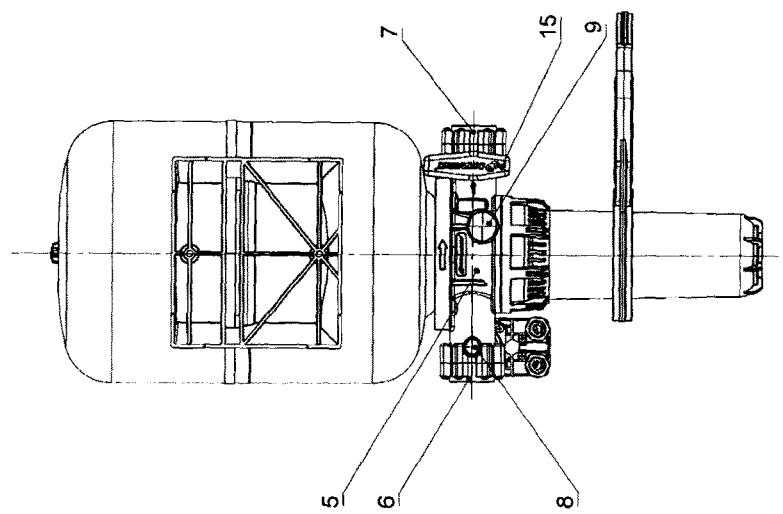

(51) Int. Cl.
*E03B 7/04* (2006.01)
*E03B 7/07* (2006.01)
*E03B 7/09* (2006.01)
*B01D 35/027* (2006.01)
*E03B 11/02* (2006.01)
*C02F 1/00* (2006.01)

(52) U.S. Cl.
CPC .............. *E03B 7/074* (2013.01); *E03B 7/075* (2013.01); *E03B 7/095* (2013.01); *E03B 11/02* (2013.01); *B01D 2201/20* (2013.01); *B01D 2201/287* (2013.01); *C02F 2201/006* (2013.01); *C02F 2209/03* (2013.01); *C02F 2307/14* (2013.01); *Y02A 20/106* (2018.01)

(58) Field of Classification Search
CPC ............ C02F 2201/006; C02F 2307/14; C02F 2209/03; C02F 1/005; C02F 2201/004; C02F 2201/005; B01D 35/02; B01D 35/027; B01D 35/0276; B01D 35/14; B01D 35/143; B01D 35/153; B01D 35/157; B01D 35/1573; B01D 2201/16; B01D 2201/20; B01D 2201/202; B01D 2201/28; B01D 2201/287; B01D 2201/31; B01D 2201/307; E03C 1/021; E03C 2201/40; E03C 2201/80

USPC ........ 210/85, 90, 109, 110, 137, 232, 257.1, 210/435, 459, 460
See application file for complete search history.

(56) References Cited

U.S. PATENT DOCUMENTS

| | | | | |
|---|---|---|---|---|
| 4,109,676 A | * | 8/1978 | Price | B01D 29/072 137/550 |
| 5,188,727 A | * | 2/1993 | Kurth | C02F 1/003 210/282 |
| 5,203,803 A | * | 4/1993 | Schoenmeyr | B01D 61/10 137/512.2 |
| 5,445,729 A | * | 8/1995 | Monroe | B01D 61/08 210/109 |
| 2007/0262004 A1 | * | 11/2007 | Jordan | C02F 9/005 210/110 |
| 2009/0134080 A1 | * | 5/2009 | Fabig | B01D 61/022 210/137 |

FOREIGN PATENT DOCUMENTS

| | | |
|---|---|---|
| RU | 144744 U1 | 8/2014 |
| WO | 2013076721 A1 | 5/2013 |
| WO | 2014025289 A1 | 2/2014 |

* cited by examiner

WATER-SUPPLY DEVICE

CROSS REFERENCE TO RELATED APPLICATIONS

The present application is a National stage application from PCT application PCT/RU2015/000725 filed on Oct. 30, 2015, which claims priority to Russian application RU2014144131 filed on Oct. 31, 2014; all of which are incorporated in their entireties herein by reference.

FIELD OF THE INVENTION

The invention is related to the sphere of hydro-automatics and water-supply systems, may be applied for the storage of water for automatic potable and service water supply of a private house, consists of many elements and doesn't dispense with automatics.

PRIOR ART

A water-supply device (a reservoir) for the potable water storage is known, which contains a casing with closed reservoir for the water storage, formed by the panels having relevant shape, while the casing has an emptying and a filling fittings entering the reservoir, an inspection window, as well as the instrumentation equipment, differing by the fact that the surface of the panels, faced to the reservoir, has a ceramic layer, the body of which is reinforced with conductor materials, except that, the surface of this layer is covered with the quartz coating, which has the UV-elements in its composition that interact with the electromagnetic field that appears between the conductor materials, while the conductor materials are connected to a high-frequency generator located outside the reservoir, with a possibility to create the ultra-violet radiation conditions through the internal surface of the reservoir to its space by means of mentioned elements located in the quartz coating. The emptying and filling fittings are equipped with the ultraviolet filters (RU 2472688).

A water-supply device (a water tank) of the railway passenger car is known, which includes a tank casing and a filter for the solid waste collecting and a water decontaminating equipment, connected to the casing; the casing is made of laminated plastic and has the shape of the vertically pulled and depressed rectangular parallelepiped; the tank has a nozzle for the source water inlet, a nozzle for the sterilized water inlet and a discharge orifice; the casing cavity is divided by the range of partitions, attached to the casing walls, in the horizontally pulled sections, each of the partitions has a hole in one of its ends, besides all the holes of the partitions are located in them in such a way that they form in the casing cavity a winding serpentine labyrinth for the water overflow from the upper section, in which a casing inlet nozzle is located, to the lower section with the discharge orifice, at that, each partition, forming the labyrinth, is deflected from the horizontal position from 2 to 6°, in such a way that its slope is faced to the hole, by means of which this section contacts with the lower in relation to it section; the space of each section is additionally divided in the stages by means of the plates fixed in the casing, each of which has a hole in its lower part that provides connection of one stage with the neighboring stage for the possibility of the water overflow from the first stage of the upper section, at that, the filter for the solid waste collecting is connected to the discharge orifice, which has a set of the filtering elements, a separating tank with a nozzle equipped with a valve for the sludge discharge and a nozzle for the product water consumers connection, and the water decontaminating equipment is made in the form of the cylindrical vertically oriented circulating sterilizing room, equipped with an UV lamp, an ultrasonic transducer and a transporting pump; the inlet nozzle of the circulating room is connected with the last casing stage by a pipework, and its discharge nozzle is connected with the first casing stage by a pipework with the transporting pump installed on it, besides, the partitions and the plates, as well as the internal layer of the walls and the bottom of the casing are made of a material with the antibacterial properties (RU 2418701).

A water-supply device (a reservoir for the water-supply system) is known, which includes a casing and a filter for the solid waste collecting and water decontaminating equipment, connected to the casing; the casing is made of laminated plastic and has the shape of the vertically oriented depressed rectangular parallelepiped; the casing has a nozzle for the source water inlet, a nozzle for the sterilized water inlet and a discharge orifice; the casing cavity is divided by the range of the partitions, attached to the casing walls, in the horizontally pulled sections, each of the partitions has a hole in one of its ends, besides all the holes of the partitions are located in them in such a way that they form in the casing cavity a winding serpentine labyrinth for the water overflow from the upper section to the lower section, at that, each partition, forming the labyrinth, is deflected from the horizontal position in such a way that its slope is faced to the hole, by means of which this section contacts with the lower in relation to it section, besides, the space of each section is additionally divided in the stages by means of the plates, each of which is fixed in the casing in such a way that every plate has a hole in its lower part that ensures the water overflow from the first stage of the upper section with the nozzle for the source water inlet and the nozzle for the sterilized water inlet, consistently through all sections till the last stage of the lower section where the casing discharge hole is located; the filter for the solid waste collecting is connected to the discharge orifice, which has a set of the filtering elements and a nozzle for the product water consumers connection (RU 89520, prototype).

The disadvantages of the known devices are the complexity of the structure and large dimensions, as well as the control and operation complexity. As a rule, the consumer has to configure and make assembling of odd elements of the system by himself, which is inconvenient.

SUMMARY OF THE INVENTIONS

The technical task of the invention is a creation of an effective water-supply device and the water-supply devices range increase.

The technical result that ensures the set task solution is in the fact that the dimensions have been reduced and the device structure has been simplified at the cost of the number of transferring and connecting parts minimizing, with the simultaneous improvement of the control and operation conditions by means of the water-supply regimes from one working place—from a commutator that presents a set of equipment for the automation of the device operation in the whole.

The essence of the invention is in the fact that the water-supply device contains a vertically oriented hydraulic accumulator, an inlet and an outlet connections and connected to the hydraulic accumulator filter with a removable cartridge, located in the casing, at that, the hydraulic accumulator is made in the suspended manner and equipped with a commutator with a flange for the attachment to the hydraulic accumulator, fixed in its lower part; the above mentioned commutator is made with the channels, connected with the inlet and outlet connections, and with the holes for the controlling and regulating equipment attachment, and the filter casing is installed on the thread at the commutator.

It is preferably that the filter casing shall be installed vertically, and the inlet and outlet connections shall be located horizontally and directed conversely, the filter casing shall be fixed on the thread, made on the commutator, by means of a replaceable nut, the hydraulic accumulator shall be made of metal, in the form of the cylinder with the round edges, and shall be equipped with a bracket for hanging to a support and a worm drive clamp for the bracket position on the hydraulic accumulator regulating.

At that, the device is equipped with a sign of the month of change of the filter cartridge, fixed on the clamp, the controlling and regulating equipment is made in the form of a manometer and a pressure relay, connected with the commutator channel with a possibility to be rearranged and connected to any connection, the commutator is equipped with a return valve, installed in front of the inlet connection, and with a globe valve, and the filter is equipped with a plug for the nut rotation.

SHORT DESCRIPTION OF DRAWINGS

Figure 2:
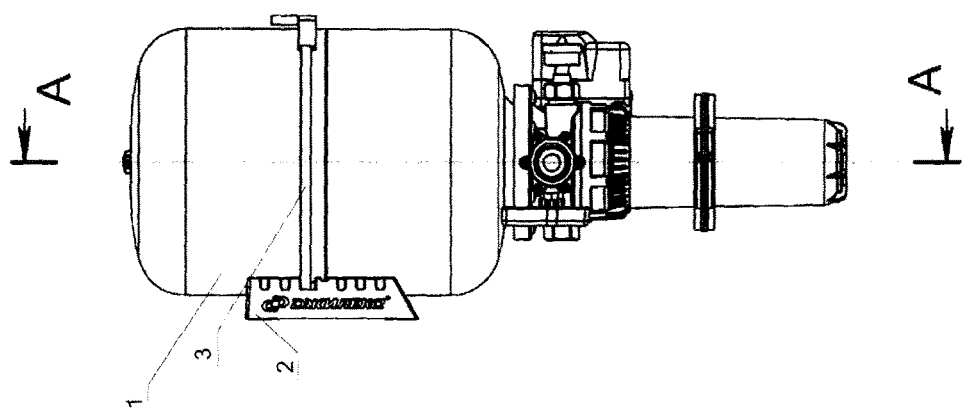
Figure 1:
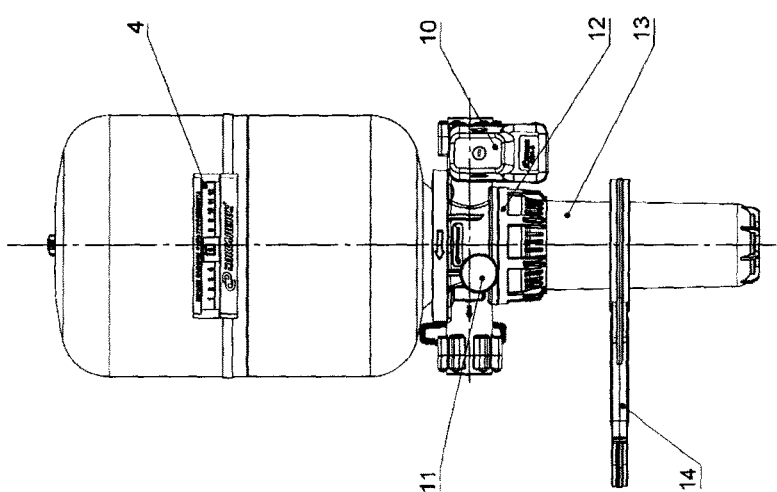
Figure 4:
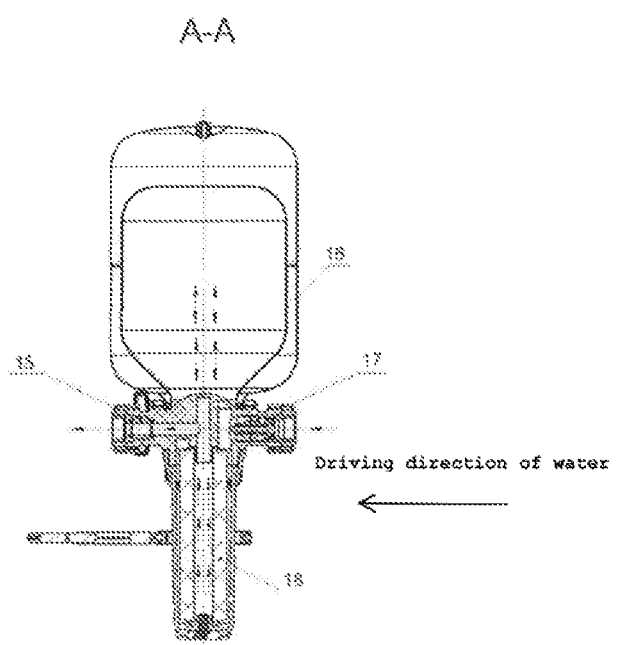

The drawing,
FIG. 1 shows the water-supply device, front elevation,
FIG. 2—elevational drawing by FIG. 1,
FIG. 3—back elevation by FIG. 1,
FIG. 4—section A-A by FIG. 2.

DETAILED DESCRIPTION OF THE INVENTION

The water-supply device (industrial designation—CRAB) contains the vertically oriented hydraulic accumulator 1 with the membrane 16, the inlet and outlet connections 6, 7, accordingly and the filter 13, conjoint to the hydraulic accumulator, with the removable cartridge 18 located in the casing. The hydraulic accumulator 1 is made in the suspended manner and equipped with the multifunctional commutator 5, fixed in its lower part, with the flange in its upper part, for the attachment to the hydraulic accumulator 1. The commutator 5 (its casing part) is made with the channels, connected with the inlet and outlet connections 6, 7, and with the holes 8, 9 for the controlling and regulating equipment attachment, and the casing of the filter 13 is installed on the thread made at the commutator 5, which functionally serves as the cover of the casing of the filter 13.

The casing of the filter 13 is installed vertically (coaxially to the accumulator 1), and the inlet and outlet connections 6, 7 are located horizontally by both sides of the filter 13 and oppositely directed: the connection 6 is to the pump, and the connection 7—to the water consumer.

The casing of the filter 13 is fixed on the thread, made at the collector 5, by means of the removable nut 12.

The hydraulic accumulator 1 is made welded, of the metal sheet, in the geometrical shape of a cylinder with the round edges, and equipped with the bracket 2 for hanging to the support (without image) and with the worm drive clamp 2 on the hydraulic accumulator 1.

The device is equipped with the sign 4 of the month of change of the filter 13 cartridge 18, which is fixed on the clamp 3.

The controlling and regulating equipment of the commutator 5 is made in the form of the manometer 11 and the pressure relay 10, connected with the commutator 5 channel with a possibility to be rearranged and connected to any of connections 6, 7 through the holes 8, 9 (unused holes 8, 9 are blinded off):

The collector 5 is equipped with the built-in return valve 17, installed in front of the inlet connection 6 and built-in globe valve 15 with the rotation plug, installed in front of the inlet connection 7.

The filter 13 has the cartridge (filtering element) 18, leaking from the periphery to the central channel, and is equipped with dismountable-mountable plug 14 for the nut 12 rotation during the filter 13 casing assembling on the commutator 5.

So, the basis of the CRAB proposed device is the multifunctional part commutator 5, to which such elements as listed below can be connected without additional transition members:

Hydraulic accumulator 1 (the upper part of the commutator 5 is the flange of the hydraulic accumulator;
The casing of the cartridge filter 13 (the lower part of the commutator 5 is the cover of the cartridge filter 13, the filter 13 casing is fixed to the commutator 5 by the nut 12);
Pressure relay 10;
Manometer 11;
Inlet connection 6, the built-in return valve 17 is located behind the inlet connection 6;
The outlet connection 7, the built-in globe valve 15, which is controlled by the plug, is located in front of the outlet connection.

Preferred Embodiment

The water-supply device is operated as follows.
The device is supplied to the operation area in the assembled condition and requires the fixation on the wall of the bracket 2 with the further fixation of the hydraulic accumulator 1 on the bracket 2 by means of the worm drive clamp 3. The water comes through the connection 6 to the filters, as well as through the cartridge 18 to the hydraulic accumulator 1 and to the connection 7 to the consumer, in case of the opened globe valve 15. The return valve 17 prevents spontaneous water leakage. The rated direction of the water supply is shown with the arrows at the external surface of the commutator 5.

The holes (outlets) 8 and 9, unused for the manometer 11 and the pressure relay 10, shall be blinded with the blind joints. It is also possible to assemble additional automatic elements on free holes 8, 9, in particular, such as the flow, liquid temperature control, etc.

The system is completed with the plug 14 for the nut 12 rotation when changing the filter 13 cartridge. The sign 4 with the month of the filter element 4 changing with help of the worm drive clamp 3 is also fixed on the hydraulic accumulator 1.

The main advantage of the device is that the consumer is provided a possibility to locate compactly the constructively and functionally joint in one item (product) integrated functions of:

The return valve 17;
Automatic control of the pump by the pressure relay 10 signals;
Visual control of current pressure in the system by means of the manometer 11;
Water filtering by the filter 13;

Regulating of the manifold flow passage by the globe valve 15;

Accumulating of a certain water volume;

Recording of the month of the filter 13 cartridge changing;

Equipping, if necessary, with the additional elements of automatics (shall be connected to the unused holes 8, 9 instead of the blind joints).

The consumer has a possibility to configure the device equipment, control it visually and operate from one place, at one operational field—commutator 5. During the volumetric flow and/or pressure rate regulating, the consumer has a possibility to control effectively the result of the regulating and make the gradual regime selection.

As a result, the dimensions have been reduced and the device structure has been simplified at the cost of the number of transferring and connecting parts minimizing, with the simultaneous improvement of the conditions of the control and operation over the water-supply regimes from one working place—from a commutator 5 that presents constructively and functionally the combined unit of the water-supply device in the whole.

INDUSTRIAL APPLICATIONS

The present invention is embodied with multipurpose equipment extensively employed by the industry.

What is claimed is:

1. A water-supply device comprising:
   a vertically oriented hydraulic accumulator,
   a bracket attached to said hydraulic accumulator, said bracket being mountable to a support,
   a filter for the hydraulic accumulator with a removable cartridge,
   a commutator, wherein the commutator is a single piece, comprising:
     an upper part, said upper part being a flange for an attachment to the hydraulic accumulator,
     a lower part, said lower part being a threaded cover for an attachment to the filter,
     an inlet connection,
     an outlet connection,
     a connection for a pressure relay, and
     a connection for a manometer.

2. The device of claim 1, wherein the cartridge is installed vertically, and the inlet and outlet connections are oriented horizontally.

3. The device of claim 1, wherein the filter is attached to the commutator by means of a replaceable nut.

4. The device of claim 3, wherein the filter is equipped with a plug for rotation of the nut.

5. The device of claim 1, wherein the hydraulic accumulator is metal, in a form of a cylinder with round edges, and further comprising a worm drive clamp for fixing the bracket to the hydraulic accumulator.

6. The device of claim 5, further comprising an indicator of a date to change the cartridge, the indicator being fixed on the worm drive clamp.

7. The device of claim 1, further comprising a manometer and a pressure relay.

8. The device of claim 1, wherein the commutator is equipped with a non-return valve installed proximate to the inlet connection, and with a globe valve installed proximate to the outlet connection.

* * * * *